US012309337B2

(12) United States Patent
Ishibashi

(10) Patent No.: US 12,309,337 B2
(45) Date of Patent: May 20, 2025

(54) INFORMATION PROCESSING APPARATUS, NON-TRANSITORY COMPUTER READABLE MEDIUM STORING INFORMATION PROCESSING PROGRAM, AND INFORMATION PROCESSING METHOD

(71) Applicant: FUJIFILM Business Innovation Corp., Tokyo (JP)

(72) Inventor: Tomohiro Ishibashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 319 days.

(21) Appl. No.: 17/900,888

(22) Filed: Sep. 1, 2022

(65) Prior Publication Data
US 2023/0216973 A1   Jul. 6, 2023

(30) Foreign Application Priority Data
Jan. 6, 2022   (JP) .................. 2022-001302

(51) Int. Cl.
G06K 15/00 (2006.01)
H04N 1/00 (2006.01)
H04N 1/32 (2006.01)

(52) U.S. Cl.
CPC ....... H04N 1/32096 (2013.01); H04N 1/0048 (2013.01)

(58) Field of Classification Search
CPC .......................... H04N 1/32096; H04N 1/0048
USPC ........................................................ 358/1.15
See application file for complete search history.

(56) References Cited

U.S. PATENT DOCUMENTS

| 2012/0236348 | A1* | 9/2012 | Ochi | G06Q 10/107 358/1.13 |
| 2012/0268766 | A1* | 10/2012 | Okubo | H04N 1/33323 358/1.13 |
| 2015/0022867 | A1* | 1/2015 | Morita | H04N 1/00411 358/405 |
| 2016/0337537 | A1* | 11/2016 | Morita | H04N 1/4426 |
| 2017/0171402 | A1* | 6/2017 | Yamaguchi | H04N 1/00307 |
| 2019/0089862 | A1* | 3/2019 | Sugawara | H04N 1/00212 |

FOREIGN PATENT DOCUMENTS

JP   2020198600   12/2020

OTHER PUBLICATIONS

IP.com search history (Year: 2025).*
ProQuest search history (Year: 2025).*

* cited by examiner

Primary Examiner — Moustapha Diaby
(74) Attorney, Agent, or Firm — JCIPRNET

(57) ABSTRACT

An information processing apparatus includes a processor configured to: in a case where a selection function selected by a user does not correspond to an operation address that is an address associated with an operation unit operated by the user, cause a display unit to display a screen showing an address corresponding to a relationship between a registered address, which is an address registered in a contact address associated with the operation address, and the selection function.

20 Claims, 11 Drawing Sheets

FIG. 3

| CONTACT ADDRESS | APPLICATION | REGISTERED ADDRESS | ONE-TOUCH KEY |
|---|---|---|---|
| A | FAX | 012-111-2222 | (1) |
| A | INTERNET FAX | a_ifax@example.com | NONE |
| A | MAIL | a_mail@example.com | NONE |
| A | MAIL | aaa_mail@example.com | NONE |
| B | INTERNET FAX | b_ifax@example.com | (2) |
| B | MAIL | b_mail@example.com | NONE |
| C | INTERNET FAX | ccc@example.com | (3) |
| C | MAIL | ccc@example.com | NONE |

INFORMATION PROCESSING APPARATUS, NON-TRANSITORY COMPUTER READABLE MEDIUM STORING INFORMATION PROCESSING PROGRAM, AND INFORMATION PROCESSING METHOD

CROSS-REFERENCE TO RELATED APPLICATIONS

This application is based on and claims priority under 35 USC 119 from Japanese Patent Application No. 2022-001302 filed Jan. 6, 2022.

BACKGROUND (i) Technical Field

The present invention relates to an information processing apparatus, a non-transitory computer readable medium storing an information processing program, and an information processing method.

(ii) Related Art

JP2020-198600A describes a technique for efficiently performing an address book search with a small number of input operations.

SUMMARY

An image forming apparatus having a plurality of transmission functions such as a fax function and a mail function can transmit information to one contact address by a plurality of methods. Therefore, in the address book of the image forming apparatus, a plurality of addresses are often registered to one contact address. Further, the image forming apparatus is provided with a designation function of designating an address associated with a button as an operation unit that has received an operation by a user as an address of a transmission function. Since the designation function is characterized in that the address is designated by a single button operation, the address is associated with the button instead of the contact address.

However, in the case where the address is associated with the button, for example, the user may erroneously operate a button that does not correspond to the function being executed, such as selecting the button associated with the address of the mail function while the fax function is being executed.

Aspects of non-limiting embodiments of the present disclosure relate to an information processing apparatus, a non-transitory computer readable medium storing an information processing program, and an information processing method that support the next operation of a user in a case where an address that is not suitable for a function being executed is selected by the operation of the user.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: in a case where a selection function selected by a user does not correspond to an operation address that is an address associated with an operation unit operated by the user, cause a display unit to display a screen showing an address corresponding to a relationship between a registered address, which is an address registered in a contact address associated with the operation address, and the selection function.

BRIEF DESCRIPTION OF THE DRAWINGS

Exemplary embodiment(s) of the present invention will be described in detail based on the following figures, wherein:

FIG. 3 is an explanatory diagram illustrating the relationship between a contact address, an application, a registered address, and a one-touch key;

DETAILED DESCRIPTION

An image forming apparatus 20 which is an example of an information processing apparatus according to the present exemplary embodiment will be described below.

First Exemplary Embodiment

First, an image forming apparatus 20 according to a first exemplary embodiment will be described.

Figure 1:
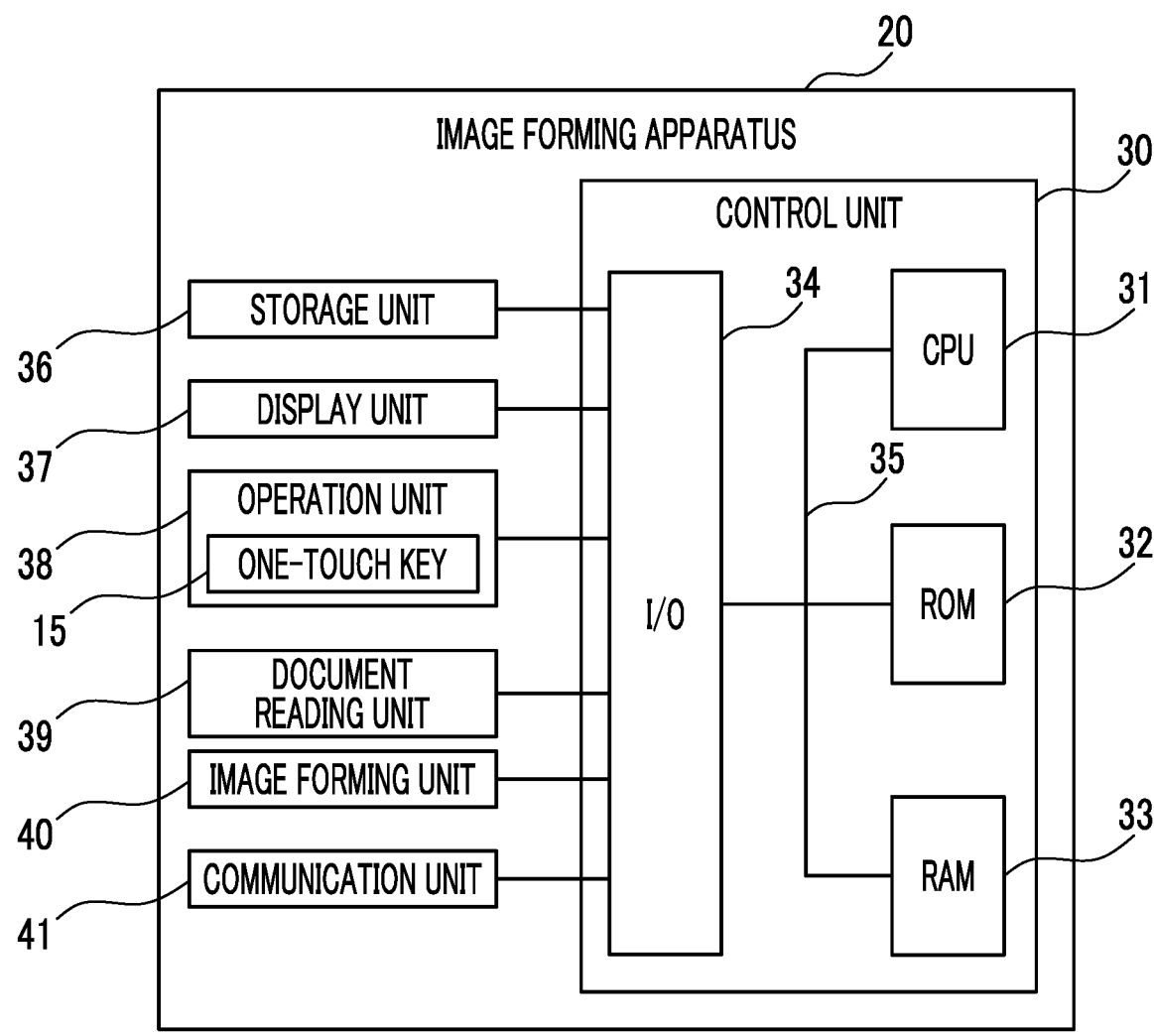
FIG. 1 is a block diagram showing a hardware configuration of an image forming apparatus.

FIG. 1 is a block diagram showing a hardware configuration of the image forming apparatus 20.

As shown in FIG. 1, the image forming apparatus 20 includes a control unit 30 that controls the operation of the image forming apparatus 20. In the control unit 30, a central processing unit (CPU) 31, a read only memory (ROM) 32, a random access memory (RAM) 33, and an input/output interface (I/O) 34 are connected to each other via a bus 35 so as to be communicable with each other.

The CPU 31 is a central arithmetic processing unit that executes various programs and controls each unit. That is, the CPU 31 scans the program from the ROM 32 or a storage unit 36 to be described later, and executes the program using the RAM 33 as a work area. The CPU 31 controls each of the above configurations and performs various arithmetic processes according to the program stored in the ROM 32 or the storage unit 36. The ROM 32 or the storage unit 36 stores at least an information processing program for executing an execution process to be described later. The information processing program may be pre-installed on the image forming apparatus 20, or may be appropriately installed on the image forming apparatus 20 by being stored in a non-volatile storage medium or being distributed via a network. Examples of the non-volatile storage medium include a CD-ROM, a magneto-optical disc, a hard disk drive (HDD), a DVD-ROM, a flash memory, a memory card, and the like. The CPU 31 is an example of a "processor".

The ROM 32 stores various programs and various data. The RAM 33 temporarily stores a program or data as a work area.

The storage unit 36, a display unit 37, an operation unit 38, a document reading unit 39, an image forming unit 40, and a communication unit 41 are connected to the I/O 34. Each of these units can communicate with the CPU 31 via the I/O 34.

The storage unit 36 is composed of a storage device such as an HDD, a solid state drive (SSD), or a flash memory, and stores various programs and various data. The storage unit 36 stores an address table in which one or more addresses are registered for each contact address. Since the image forming apparatus 20 can transmit information to one contact address by a plurality of methods (eg, mail, fax, and Internet fax), as described above, the address table has a structure in which one or more addresses are registered in one contact address as described above.

For the display unit 37, for example, a liquid crystal display, an organic electroluminescence (EL) display, or the like is used. The display unit 37 integrally has a touch panel. The display unit 37 is an example of a "display unit".

The operation unit 38 is provided with various operation keys such as a numeric keypad or a start key. In the first exemplary embodiment, as the operation key of the operation unit 38, a plurality of one-touch keys 15 for setting an operation address which is an address associated with a key operated by a user to an address of an application being executed for transmitting information (hereinafter referred to as an "executing application") are provided. The one-touch key 15 can set the address with a smaller number of operations (eg, a single key operation) as compared with the case where the address is set without using the one-touch key 15. Therefore, in the image forming apparatus 20, as mentioned above, even though the address table has a structure in which one or more addresses are registered in one contact address, the address is associated with the one-touch key 15 in order to maintain the characteristics of the one-touch key 15 that sets the address with a small number of operations.

Here, the executing application is an example of a "selection function", and the one-touch key 15 is an example of an "operation unit". The executing application is any of a mail application for transmitting information by mail, a fax application for transmitting information by fax, and an Internet fax application for transmitting information by Internet fax.

The display unit 37 and the operation unit 38 receive various instructions from a user of the image forming apparatus 20. These various instructions include, for example, an instruction to start reading the document, an instruction to start copying the document, and the like. The display unit 37 displays various information such as a result of the process executed in response to the instruction received from the user and a notification for the process.

The document reading unit 39 captures documents placed on a paper feed tray of an automatic document feeder (not shown) provided in the upper part of the image forming apparatus 20 one by one, and optically reads the captured documents to obtain image information. Alternatively, the document reading unit 39 optically reads the document placed on a document stand such as platen glass to obtain image information.

The image forming unit 40 forms an image based on the image information obtained by reading by the document reading unit 39 or image information obtained from an external personal computer (PC) or the like connected via the network on a recording medium such as paper.

The communication unit 41 is an interface for communicating with other devices. For the communication, for example, a wired communication standard such as Ethernet (registered trademark) or FDDI, or a wireless communication standard such as 4G, 5G, or Wi-Fi (registered trademark) is used.

In the case of executing the above information processing program, the image forming apparatus 20 uses the above hardware resources to execute processing based on the information processing program.

Figure 2:
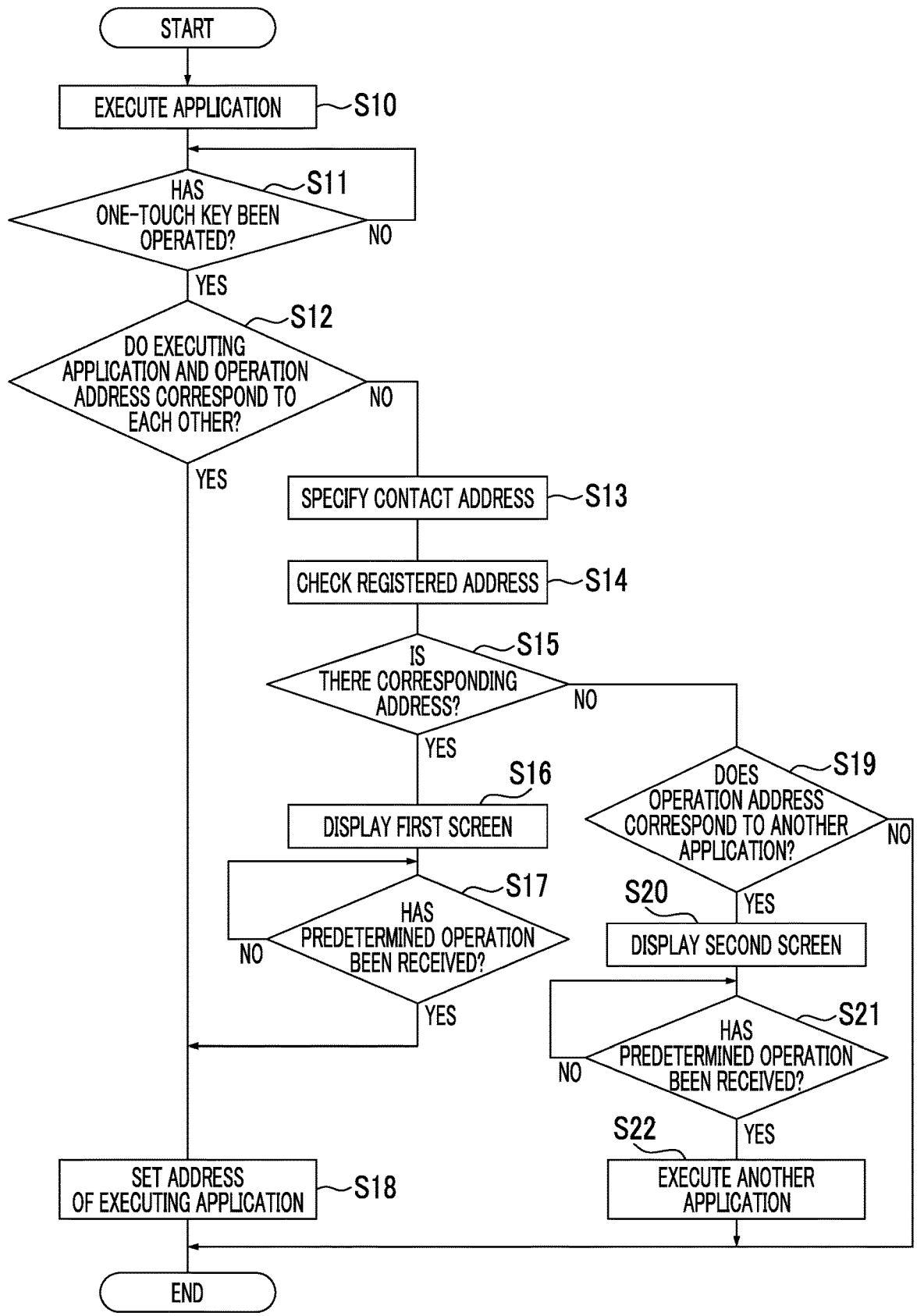
FIG. 2 is a first flowchart showing a flow of an execution process by the image forming apparatus.

FIG. 2 is a first flowchart showing a flow of an execution process by the image forming apparatus 20 to execute an operation corresponding to the one-touch key 15 operated by the user. The execution process is performed by the CPU 31 scanning an information processing program from the ROM 32 or the storage unit 36, loading the information processing program into the RAM 33, and executing the information processing program.

In step S10 shown in FIG. 2, the CPU 31 executes an application for transmitting information selected by the user. Then, the process proceeds to step S11. In the first exemplary embodiment, as the above-mentioned application, a mail application, a fax application, and an Internet fax application are pre-installed in the image forming apparatus 20. The application executed in step S10 is the "executing application".

In step S11, the CPU 31 determines whether or not any one-touch key 15 has been operated by the user, and in a case where it is determined that the one-touch key 15 has been operated (step S11: YES), the process proceeds to step S12. On the other hand, in a case where the CPU 31 determines that the one-touch key 15 has not been operated (step S11: NO), the CPU waits until the one-touch key 15 is operated.

In step S12, the CPU 31 determines whether or not the executing application and the operation address of the one-touch key 15 determined to have been operated in step S11 correspond to each other, and in a case where it is determined that the executing application and the operation address correspond to each other (step S12: YES), the process proceeds to step S18. On the other hand, in a case where the CPU 31 determines that the executing application and the operation address do not correspond to each other (step S12: NO), the process proceeds to step S13. The operation address is one address that can be used in any application registered in association with each one-touch key 15. Here, the CPU 31 determines that "the executing application and the operation address correspond to each other" in a case where the above operation address is an address that can be used in the executing application, and determines that "the executing application and the operation address do not correspond to each other" in a case where the above operation address is not an address that can be used in the executing application.

In step S13, the CPU 31 specifies a contact address associated with the operation address of the one-touch key 15 determined to have been operated in step S11 from the address table stored in the storage unit 36. Then, the process proceeds to step S14.

In step S14, the CPU 31 checks a registered address that is one or more addresses registered in the contact address specified in step S13. Then, the process proceeds to step S15.

In step S15, the CPU 31 determines whether or not the registered address checked in step S14 has a corresponding address corresponding to the executing application, and in a case where it is determined that the there is a corresponding address (step S15: YES), the process proceeds to step S16. On the other hand, in a case where the CPU 31 determines that there is no corresponding address (step S15: NO), the process proceeds to step S19. The CPU 31 determines that "there is a corresponding address" in a case where the registered address includes an address that can be used in the executing application, and determines that "there is no corresponding address" in a case where the registered address does not include an address that can be used in the executing application.

In step S16, the CPU 31 causes the display unit 37 to display a first screen indicating whether or not the corresponding address determined as "presence" in step S15 is used in the executing application. Then, the process proceeds to step S17. A specific example of the first screen will be described later.

In step S17, the CPU 31 determines whether or not the predetermined operation by the user has been received, and in a case where it is determined that the predetermined operation has been received (step S17: YES), the process proceeds to step S18. On the other hand, in a case where the CPU 31 determines that the predetermined operation has not been received (step S17: NO), the CPU waits until the predetermined operation is received. In a case where an OK button 52 (see FIG. 4), which will be described later, is operated, the CPU 31 determines that "a predetermined operation has been received". In addition to the operation on the display unit 37 described above, the CPU 31 may determine that "a predetermined operation has been received" in a case where a specific operation on the operation unit 38 is performed.

In step S18, the CPU 31 sets the address of the executing application. Then, the execution process ends. Here, in a case where the process proceeds to YES in step S12 to reach step S18, the CPU 31 sets the address of the executing application as the operation address of the one-touch key 15 determined to have been operated in step S11. On the other hand, in a case where the process proceeds to NO in step S12 to reach step S18, the CPU 31 sets the address of the executing application as the corresponding address determined as "presence" in step S15.

In step S19, the CPU 31 determines whether or not the operation address of the one-touch key 15 determined to have been operated in step S11 corresponds to another application different from the executing application, and in a case where it is determined that the operation address corresponds to another application (step S19: YES), the process proceeds to step S20. On the other hand, in a case where the CPU 31 determines that the operation address does not correspond to another application (step S19: NO), the execution process ends. The CPU 31 determines that "the operation address corresponds to another application" in a case where the above operation address is an address that can be used in another application, and determines that "the operation address does not correspond to another application" in a case where the above operation address is not an address that can be used in another application. In a case where the above operation address is not an address that can be used in another application, as an example, the application using the operation address is not installed in the image forming apparatus 20. Further, the present invention is not limited thereto, and even though the above operation address is an address that can be used in another application, in a case where the other application cannot be used due to poor communication or the like, the CPU 31 may determine that "the operation address does not correspond to another application". In other words, the CPU 31 may determine that "the operation address corresponds to another application" in a case where the above operation address is an address that can be used in another application and the other application can be used. Note that another application is an example of "another function".

In step S20, the CPU 31 causes the display unit 37 to display a second screen indicating whether or not to execute another application. Then, the process proceeds to step S21. A specific example of the second screen will be described later.

In step S21, the CPU 31 determines whether or not the predetermined operation by the user has been received, and in a case where it is determined that the predetermined operation has been received (step S21: YES), the process proceeds to step S18. On the other hand, in a case where the CPU 31 determines that the predetermined operation has not been received (step S21: NO), the CPU waits until the predetermined operation is received. In a case where an OK button 52 (see FIG. 5) is operated, the CPU 31 determines that "a predetermined operation has been received". In addition to the operation on the display unit 37 described above, the CPU 31 may determine that "a predetermined operation has been received" in a case where a specific operation on the operation unit 38 is performed.

In step S22, the CPU 31 executes another application. Then, the execution process ends.

Next, specific examples of the first screen and the second screen will be described with reference to FIGS. 3, 4, and 5.

FIG. 3 is an explanatory diagram illustrating the relationship between a contact address, an application, a registered address, and the one-touch key 15.

In FIG. 3, it is assumed that "A", "B", and "C" are displayed as user names indicating the names of users in the contact addresses, and three users are registered.

In the contact address of user A, as registered addresses, an address associated with the fax application (hereinafter referred to as a "fax address"), an address associated with the Internet fax application (hereinafter referred to as an "Internet fax address"), and an address associated with the mail application (hereinafter referred to as a "mail address") are registered.

Further, the Internet fax address and the mail address are registered as the registered addresses in the contact addresses of user B and user C.

Here, in FIG. 3, three one-touch keys (1), one-touch keys (2), and one-touch keys (3) are provided as the one-touch keys 15. The one-touch key (1) is associated with the fax address "012-111-2222" of user A, the one-touch key (2) is associated with the Internet fax address "b_ifax@example.com" of user B, and the one-touch key (3) is associated with the Internet fax address "ccc@example.com" of user C.

Figure 4:
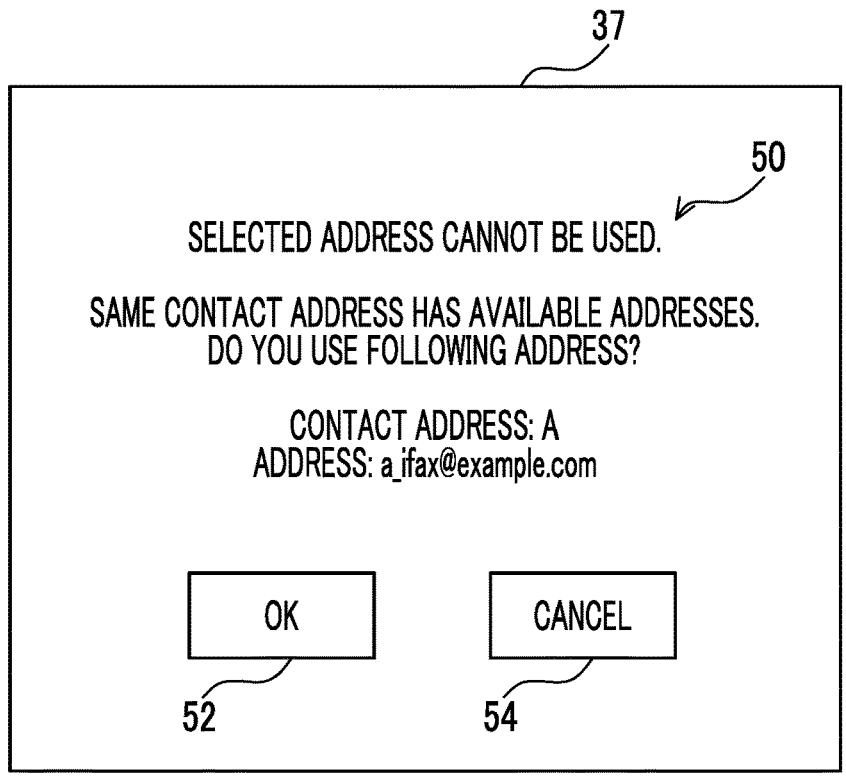
FIG. 4 is a first display example of a display unit of the image forming apparatus.

FIG. 4 is a first display example of the display unit 37 of the image forming apparatus 20. Specifically, FIG. 4 shows a first screen after the one-touch key (1) is operated after the execution of the Internet fax application.

On the first screen shown in FIG. 4, message information 50, an OK button 52, and a cancel button 54 are displayed.

The message information 50 indicates various messages to the user. As an example, in FIG. 4, as the message information 50, "The selected address cannot be used. The same contact address has available addresses. Do you use the following address? Contact address: A Address: a_ifax@example.com" are displayed.

The OK button 52 shown in FIG. 4 is a button for setting a corresponding address for the executing application.

The cancel button 54 is a button for returning to the screen displayed before the one-touch key 15 is operated.

As described above, the first screen shown in FIG. 4 indicates whether or not the corresponding address "Internet fax address of user A" is used in the executing application "Internet fax application".

Figure 5:
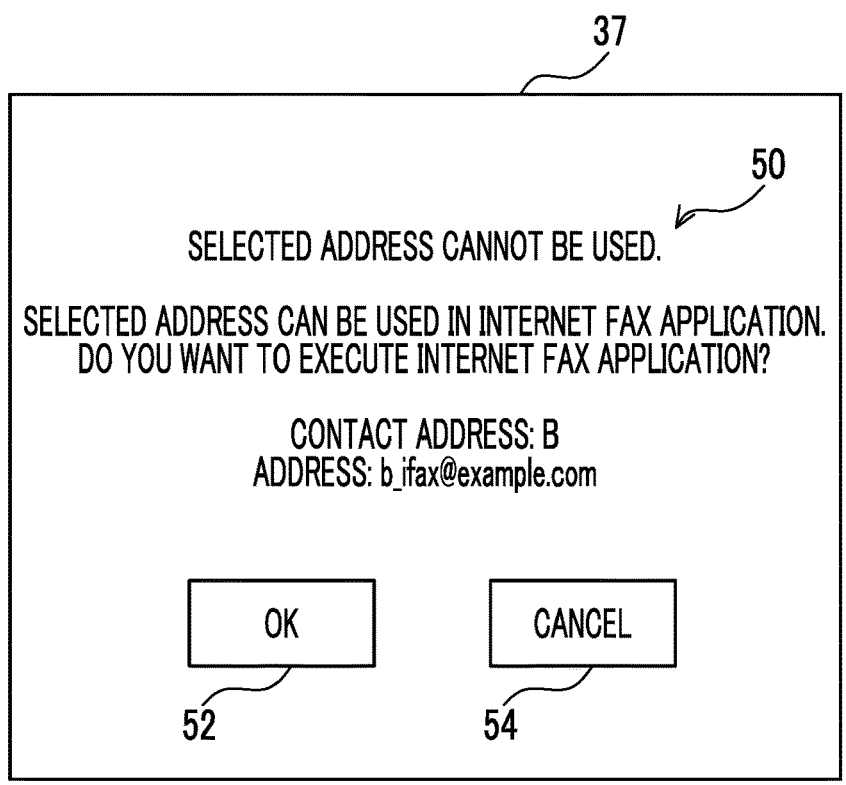
FIG. 5 is a second display example of the display unit of the image forming apparatus.

FIG. 5 is a second display example of the display unit 37 of the image forming apparatus 20. Specifically, FIG. 5 shows a second screen after the one-touch key (2) is operated after the execution of the fax application.

On the second screen shown in FIG. 5, message information 50, an OK button 52, and a cancel button 54 are displayed.

As an example, in FIG. 5, as the message information 50, "The selected address cannot be used. The selected address can be used in the Internet Fax application. Do you want to execute the Internet fax application? Contact address: B Address: b_ifax@example.com" are displayed.

The OK button 52 shown in FIG. 5 is a button for executing another application, here, an Internet fax application.

As described above, the second screen shown in FIG. 5 indicates whether or not to execute another application "Internet fax application".

As described above, in the first exemplary embodiment, in a case where the executing application and the operation address associated with the one-touch key 15 do not correspond to each other, the CPU 31 causes the display unit 37 to display a screen showing the address corresponding to the relationship between the registered address registered in the contact address associated with the operation address and the executing application. The relationship between the registered address and the executing application is, for example, whether or not the registered address has a corresponding address corresponding to the executing application.

Here, since the address table has a structure in which one or more addresses are registered in one contact address, the user of the image forming apparatus 20 often thinks that the address table is based on a contact address, that is, an operation centered on a person. However, since the address is associated with the one-touch key 15, in the operation centered on a person, for example, it is assumed that an address that is not suitable for the executing application is selected, such as operating the one-touch key 15 associated with the mail address while the fax application is being executed.

However, regarding the above problem, in the first exemplary embodiment, by providing the above configuration, the next operation of the user may be supported in a case where an address that is not suitable for the executing application is selected by the operation of the user. Then, in the first exemplary embodiment, in a case where the registered address has a corresponding address corresponding to the executing application, the CPU 31 causes the display unit 37 to display a first screen indicating whether or not the corresponding address is used in the executing application as a screen showing the address according to the relationship between the registered address and the executing application. Thereby, according to the first exemplary embodiment, it is possible to prompt the user whether or not to use the corresponding address in the executing application instead of the operation address.

Further, in the first exemplary embodiment, in a case where the operation of the OK button 52 by the user is received on the first screen, the CPU 31 sets the corresponding address to the executing application. Thereby, according to the first exemplary embodiment, in a case where an address that is not suitable for the executing application is selected by the operation of the user, it is possible to set an address that is suitable for the executing application.

Further, in the first exemplary embodiment, in a case where the registered address does not have a corresponding address corresponding to the executing application, but the operation address corresponds to another application different from the executing application, the CPU 31 causes the display unit 37 to display a second screen indicating whether or not to execute the other application as a screen showing the address according to the relationship between the registered address and the executing application. Thereby, according to the first exemplary embodiment, it is possible to prompt the user whether or not to execute the other application instead of the executing application.

Further, in the first exemplary embodiment, in a case where the operation of the OK button 52 by the user is received on the second screen, the CPU 31 executes the other application. Thereby, according to the first exemplary embodiment, in a case where an address that is not suitable for the executing application is selected by the operation of the user, the other application suitable for the address may be executed.

Second Exemplary Embodiment

Next, a second exemplary embodiment will be described while omitting or simplifying the overlapping portion with the other exemplary embodiments.

Figure 6:
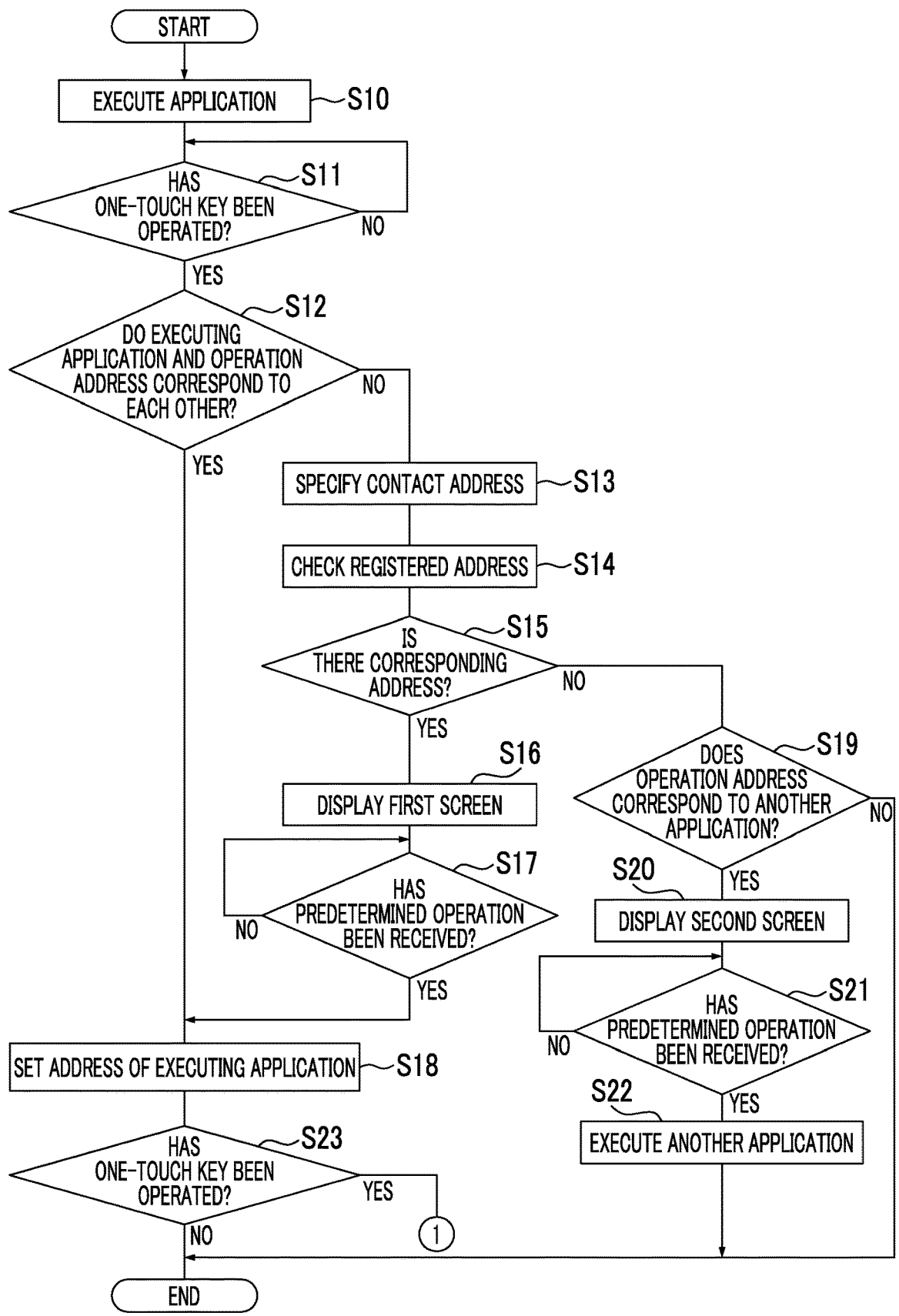
FIG. 6 is a second flowchart showing a flow of an execution process by the image forming apparatus.

FIG. 6 is a second flowchart showing a flow of an execution process by the image forming apparatus 20. Since the processes from step S10 to step S22 shown in FIG. 6 are the same as the processes in FIG. 2, the description of the overlapping portion will be omitted, and step S18 and step S23 will be described.

In step S18 shown in FIG. 6, the address of the executing application, for example, the operation address is set by the CPU 31, and then the process proceeds to step S23.

In step S23, the CPU 31 determines whether or not any one-touch key 15 has been operated by the user, and in a case where it is determined that the one-touch key 15 has not been operated (step S23: NO), the execution process ends. On the other hand, in a case where the CPU 31 determines that the one-touch key 15 has been operated (step S23: YES), the process proceeds to step S32 shown in FIG. 7.

Figure 7:
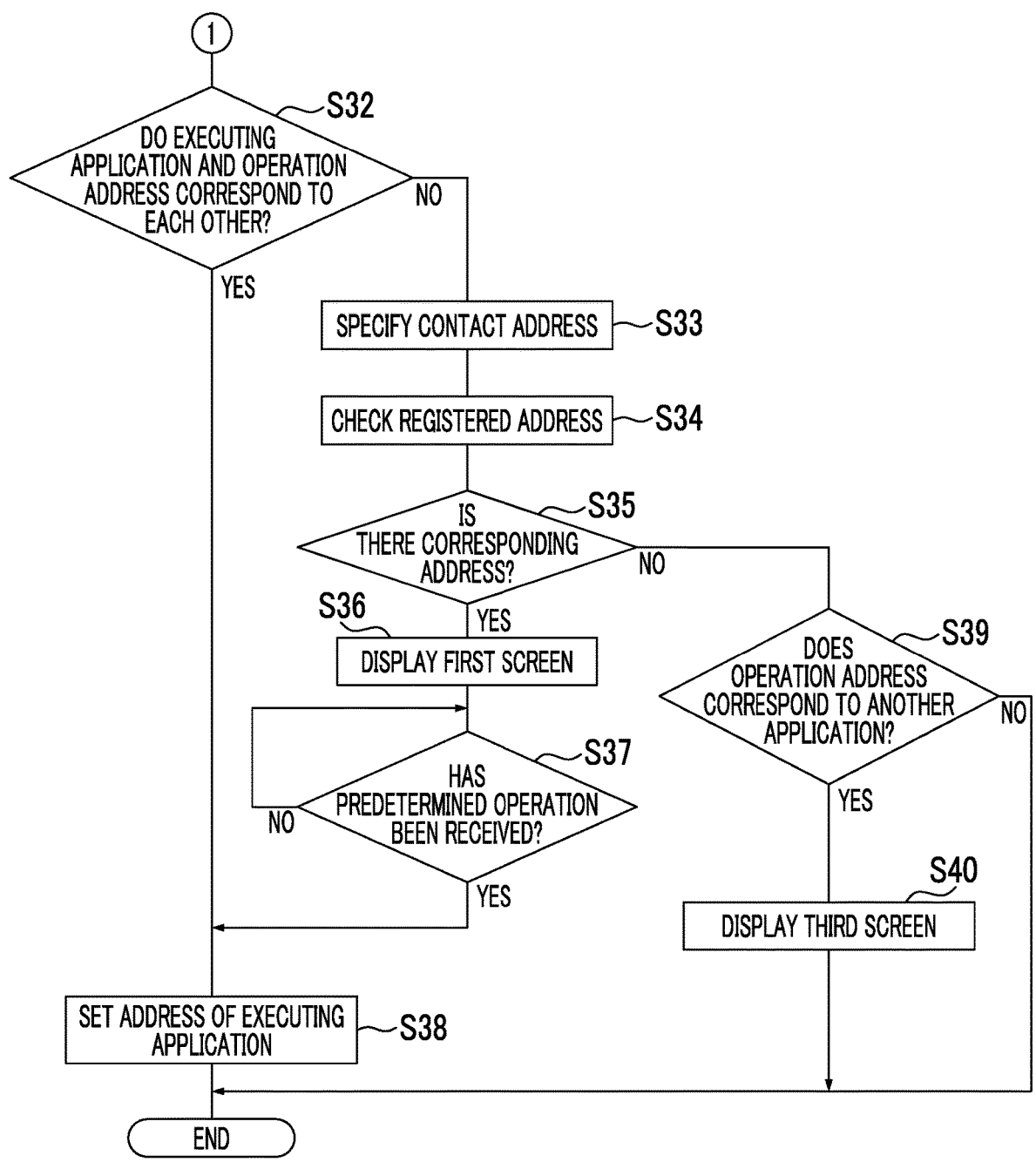
FIG. 7 is a third flowchart showing a flow of an execution process by the image forming apparatus.

FIG. 7 is a third flowchart showing a flow of an execution process by the image forming apparatus 20. Since the processes from step S32 to step S38 shown in FIG. 7 are the same as the processes from steps S12 to S18 shown in FIGS. 2 and 6, the description of the overlapping portion will be omitted, and steps S35, S39, and S40 will be described.

In step S35 shown in FIG. 7, in a case where the CPU 31 determines that there is no corresponding address (step S35: NO), the process proceeds to step S39.

In step S39, the CPU 31 determines whether or not the operation address of the one-touch key 15 determined to have been operated in step S23 shown in FIG. 6 corresponds to another application, and in a case where it is determined that the operation address corresponds to another application (step S39: YES), the process proceeds to step S40. On the other hand, in a case where the CPU 31 determines that the operation address does not correspond to another application (step S39: NO), the execution process ends.

In step S40, the CPU 31 causes the display unit 37 to display a third screen showing a procedure for executing another application. Then, the execution process ends. A specific example of the third screen will be described later.

Figure 8:
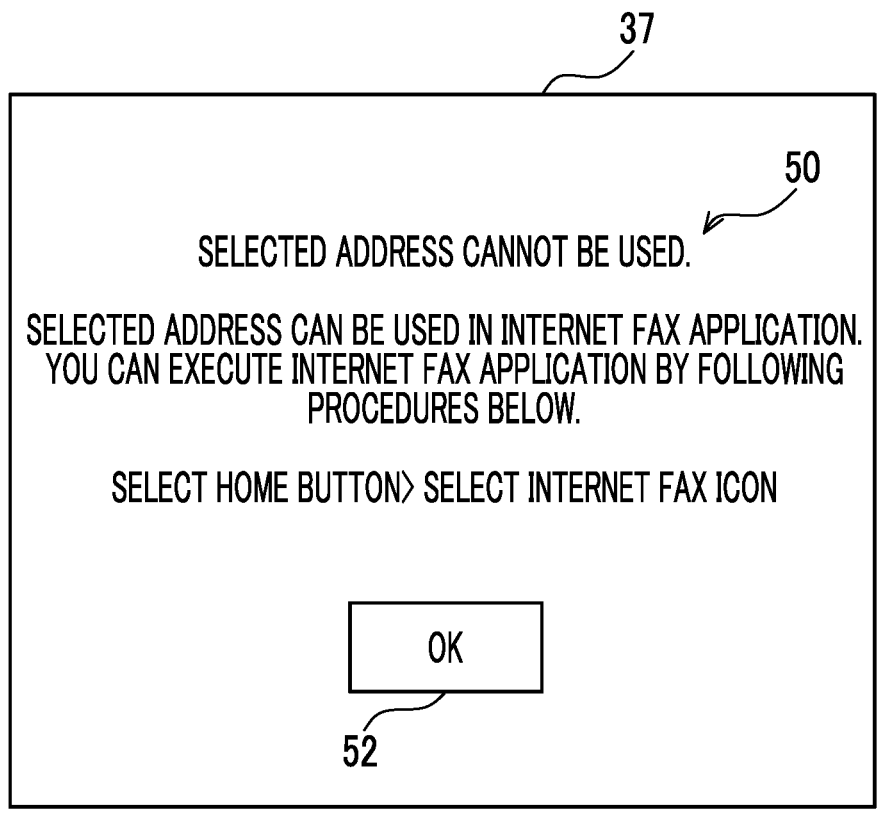
FIG. 8 is a third display example of the display unit of the image forming apparatus.

FIG. 8 is a third display example of the display unit 37 of the image forming apparatus 20. Specifically, FIG. 8 shows a third screen after the one-touch key (2) is operated after the fax address associated with the one-touch key (1) is set in the fax application.

On the third screen shown in FIG. 8, message information 50 and an OK button 52 are displayed.

As an example, in FIG. 8, as the message information 50, "The selected address cannot be used. The selected address can be used in the Internet Fax application. You can execute the Internet fax application by following the procedures below. Select Home Button> Select Internet Fax Icon" are displayed.

The OK button 52 shown in FIG. 8 is a button for returning to the screen displayed before the one-touch key 15 is operated.

As described above, the third screen shown in FIG. 8 shows a procedure for executing another application, here, an Internet fax application. In this way, unlike the second screen shown in FIG. 5, the third screen only shows the procedure for executing the other application, and the other application is not executed from the third screen. Because the third screen is a screen that is displayed after the address of the executing application is set, in a case where the other application is executed from the third screen, the address of the executing application will be discarded, which is not advisable.

As described above, in the second exemplary embodiment, in a case where after the operation address is set in the executing application, another address associated with another one-touch key 15 does not correspond to the executing application, but the other address corresponds to another application different from the executing application, the CPU 31 causes the display unit 37 to display a third screen showing a procedure for executing the other application as a screen showing the address according to the relationship between the registered address and the executing application. Thereby, according to the second exemplary embodiment, in a case where an address that is suitable for the executing application is selected by the operation of the user, and then another address that is not suitable for the executing application is selected, the user may be made to recognize the execution procedure of the other application suitable for the other address. Another one-touch key 15 is an example of "another operation unit".

Third Exemplary Embodiment

Next, a third exemplary embodiment will be described while omitting or simplifying the overlapping portion with the other exemplary embodiments.

Figure 9:
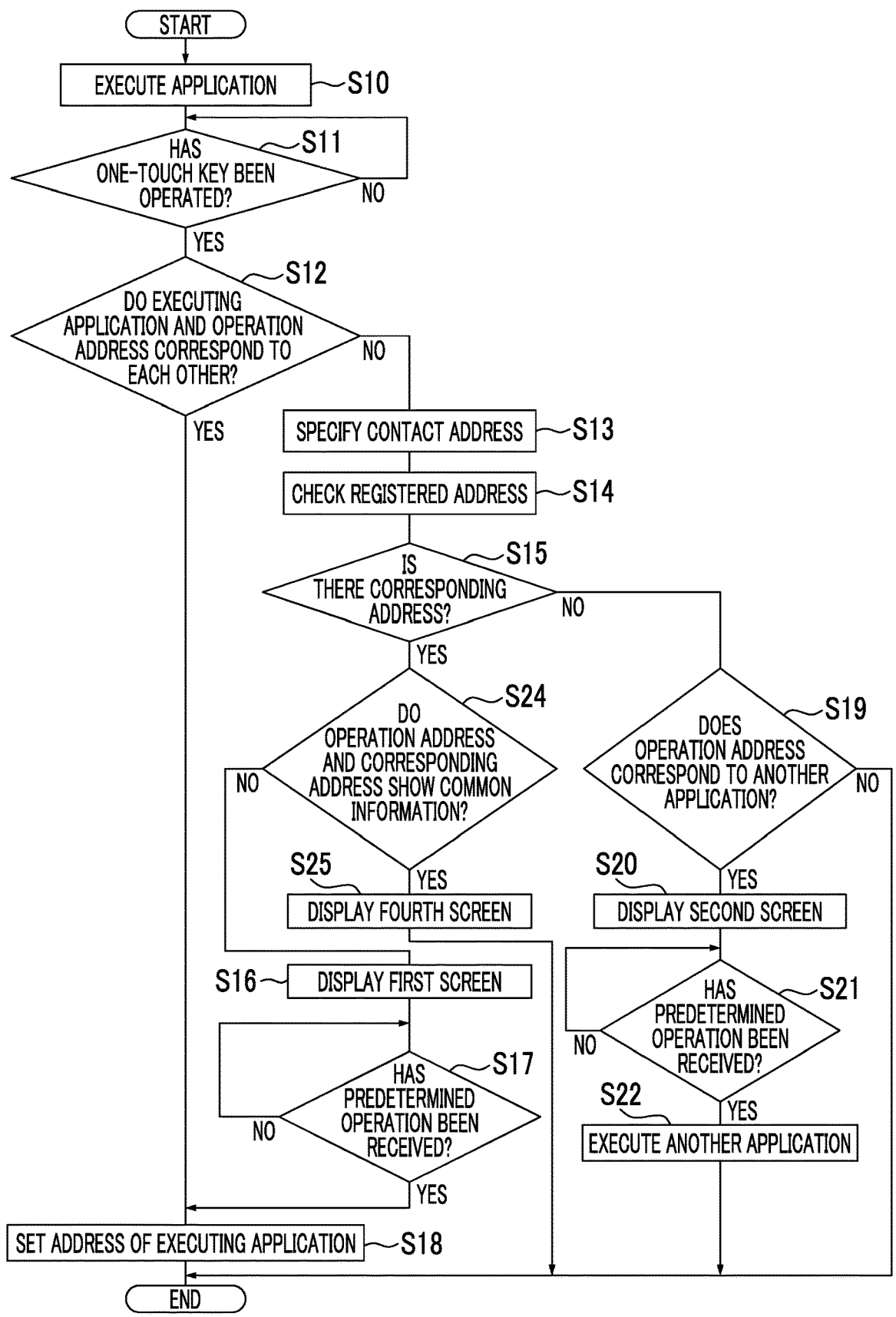
FIG. 9 is a fourth flowchart showing a flow of an execution process by the image forming apparatus.

FIG. 9 is a fourth flowchart showing a flow of an execution process by the image forming apparatus 20. Since the processes from step S10 to step S22 shown in FIG. 9 are the same as the processes in FIG. 2, the description of the overlapping portion will be omitted, and steps S15, S24, and S25 will be described.

In step S15 shown in FIG. 9, in a case where the CPU 31 determines that there is a corresponding address (step S15: YES), the process proceeds to step S24.

In step S24, the CPU 31 determines whether or not the operation address of the one-touch key 15 determined to have been operated in step S11 and the corresponding address determined as "presence" in step S15 show common information, and in a case where it is determined that the operation address and the corresponding address show common information (step S24: YES), the process proceeds to step S25. On the other hand, in a case where the CPU 31 determines that the operation address and the corresponding address do not show common information (step S24: NO), the process proceeds to step S16. As an example, the CPU 31 determines that "show common information" in a case where the above-mentioned operation address and the corresponding address show the same mail address.

In step S25, the CPU 31 sets the corresponding address determined as "presence" in step S15 in the executing application, and causes the display unit 37 to display a fourth screen indicating that the corresponding address has been set. Then, the execution process ends. A specific example of the fourth screen will be described later.

Figure 10:
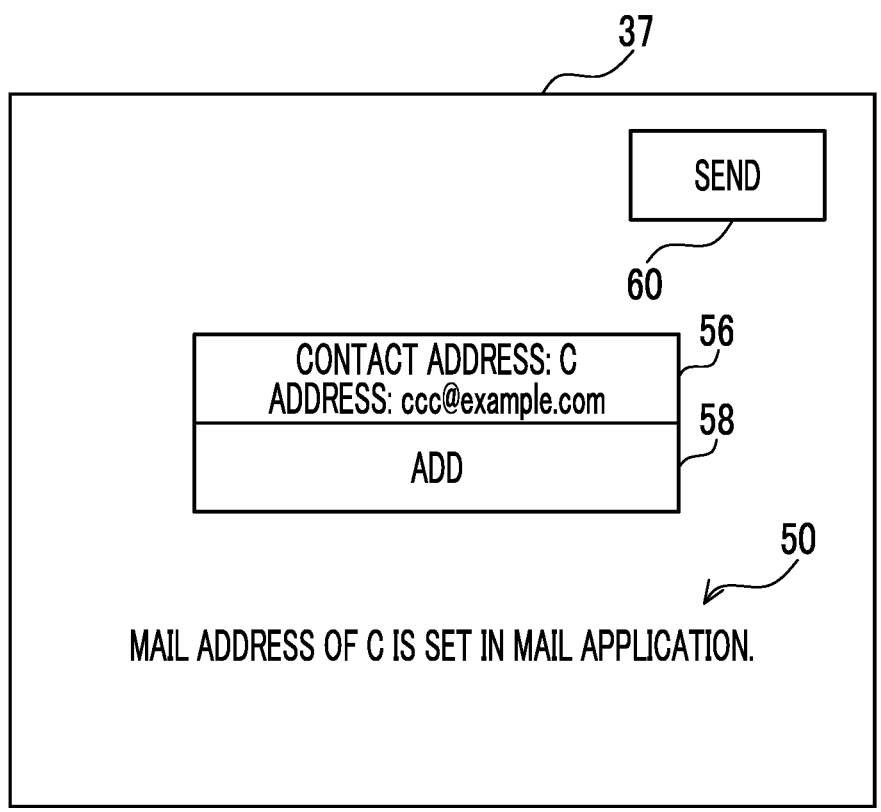
FIG. 10 is a fourth display example of the display unit of the image forming apparatus.

FIG. 10 is a fourth display example of the display unit 37 of the image forming apparatus 20. Specifically, FIG. 10 shows a fourth screen after the one-touch key (3) is operated after the execution of the mail application.

On the fourth screen shown in FIG. 10, message information 50, address information 56, an add button 58, and a send button 60 are displayed.

As an example, in FIG. 10, "The mail address of C is set in the mail application" is displayed as the message information 50.

The address information 56 indicates an address set for the application. As an example, in FIG. 10, "Contact address: C Address: ccc@example.com" and the mail address of user C are displayed as the address information 56.

The add button 58 is a button for adding an address to the application. In a case where the add button 58 is operated, the address screen showing the address table stored in the storage unit 36 is displayed, and the address selected on the address screen can be added.

The send button 60 is a button for transmitting information to the set address.

As described above, on the fourth screen shown in FIG. 10, it is shown that the mail address is set after setting the corresponding address "mail address" in the executing application "mail application". In this way, on the fourth screen, since the operation address of the one-touch key 15 operated by the user and the corresponding address show common information, the identical address is set regardless of which one is selected. Therefore, the procedure for obtaining the consent of the user is omitted.

As described above, in the third exemplary embodiment, in a case where the operation address does not correspond to the executing application but the operation address and the corresponding address corresponding to the executing application show common information, the CPU 31 sets the corresponding address in the executing application, and causes the display unit 37 to display a fourth screen indicating that the corresponding address has been set as a screen showing the address according to the relationship between the registered address and the executing application. Thereby, according to the third exemplary embodiment, in a case where an address that is not suitable for the executing application is selected by the operation of the user, it is possible to set an address that is suitable for the executing application without obtaining the consent of the user.

Fourth Exemplary Embodiment

Next, a fourth exemplary embodiment will be described while omitting or simplifying the overlapping portion with the other exemplary embodiments.

Figure 11:
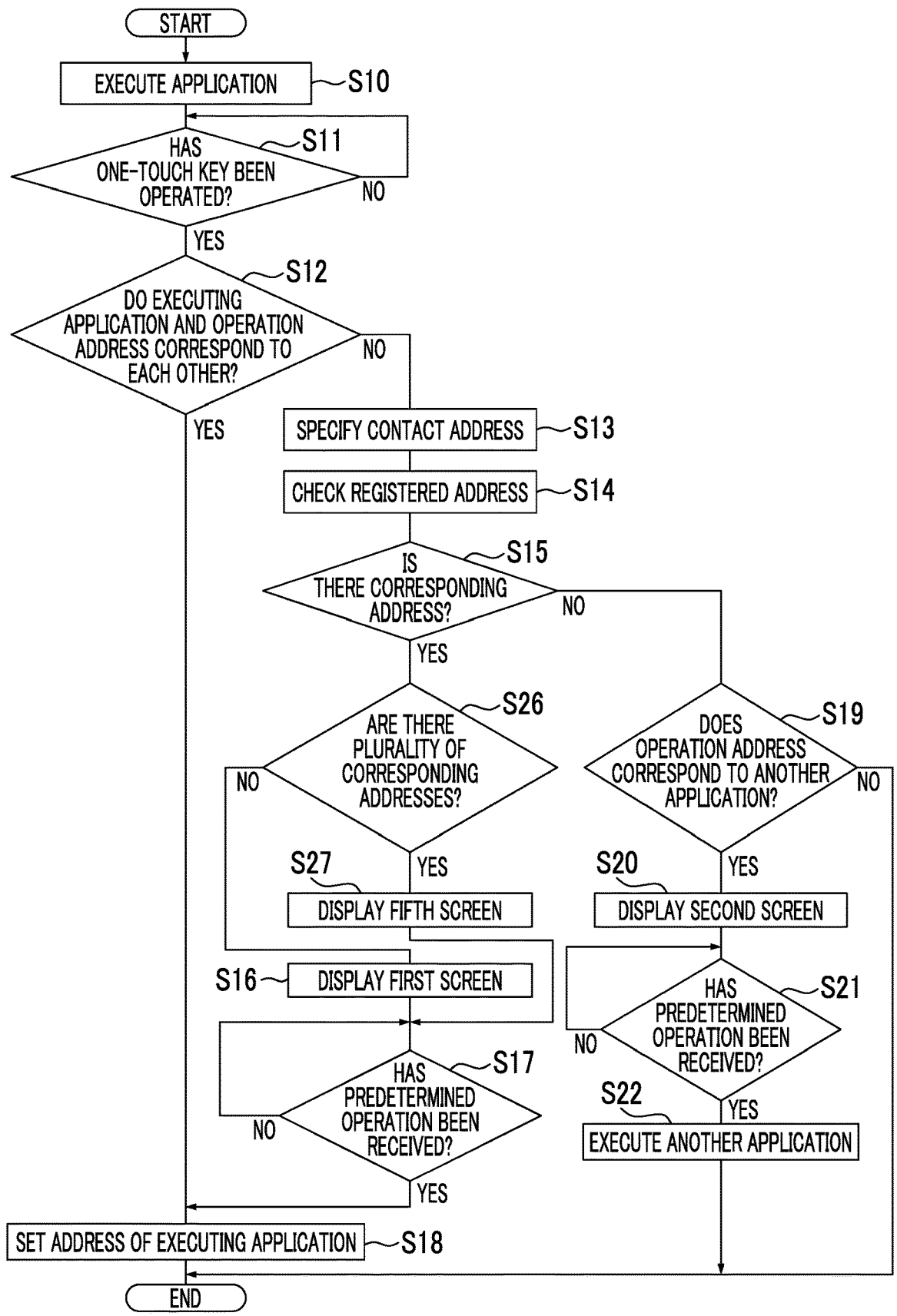
FIG. 11 is a fifth flowchart showing a flow of an execution process by the image forming apparatus.

FIG. 11 is a fifth flowchart showing a flow of an execution process by the image forming apparatus 20. Since the processes from step S10 to step S22 shown in FIG. 11 are the same as the processes in FIG. 2, the description of the overlapping portion will be omitted, and steps S15, S17, S26, and S27 will be described.

In step S15 shown in FIG. 11, in a case where the CPU 31 determines that there is a corresponding address (step S15: YES), the process proceeds to step S26.

In step S26, the CPU 31 determines whether or not there are a plurality of corresponding addresses determined as "presence" in step S15, and in a case where it is determined that there are a plurality of corresponding addresses (step S26: YES), the process proceeds to step S27. On the other hand, in a case where the CPU 31 determines that there are no corresponding addresses (step S26: NO), the process proceeds to step S16.

In step S27, the CPU 31 causes the display unit 37 to display a fifth screen showing all of the plurality of corresponding addresses determined as "presence" in step S26. Then, the process proceeds to step S17. A specific example of the fifth screen will be described later.

In step S17 proceeding from step S27, the CPU 31 determines whether or not the predetermined operation by the user has been received, and in a case where it is determined that the predetermined operation has been received (step S17: YES), the process proceeds to step S18. On the other hand, in a case where the CPU 31 determines that the predetermined operation has not been received (step S17: NO), the CPU waits until the predetermined operation is received. In a case where any of address information 56 (see FIG. 12) to be described later is operated, the CPU 31 determines that "a predetermined operation has been received". In addition to the operation on the display unit 37 described above, the CPU 31 may determine that "a predetermined operation has been received" in a case where a specific operation on the operation unit 38 is performed.

Figure 12:
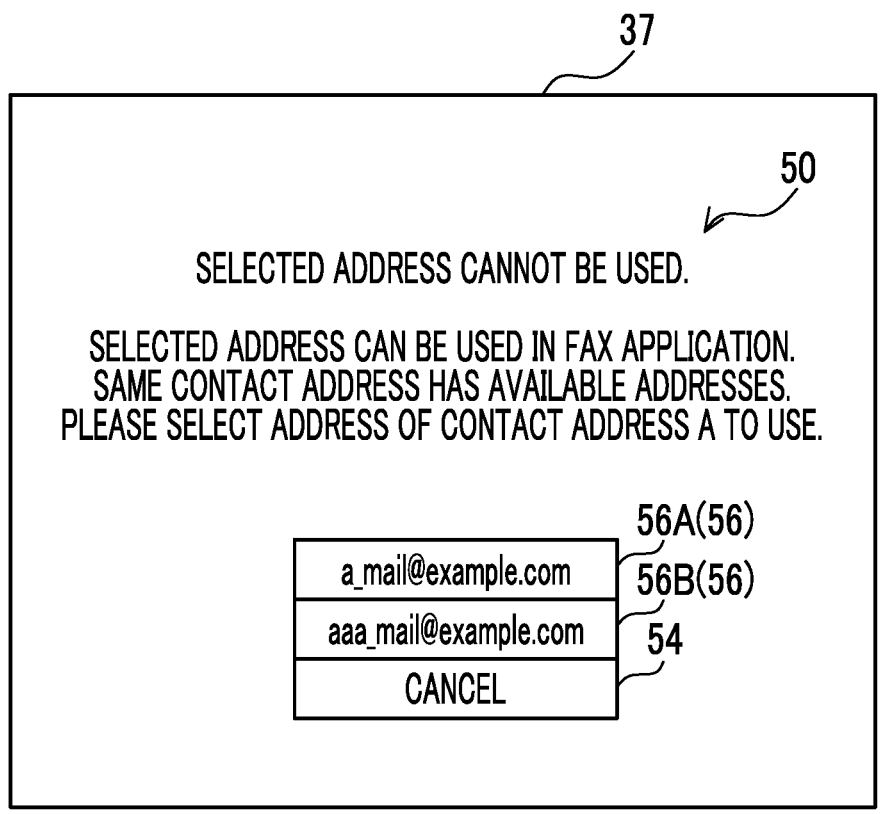
FIG. 12 is a fifth display example of the display unit of the image forming apparatus.

FIG. 12 is a fifth display example of the display unit 37 of the image forming apparatus 20. Specifically, FIG. 12 shows a fifth screen after the one-touch key (1) is operated after the execution of the mail application.

On the fifth screen shown in FIG. 12, message information 50, a cancel button 54, and address information 56 are displayed.

As an example, in FIG. 12, as the message information 50, "The selected address cannot be used. The selected address can be used in the Fax application. The same contact address has available addresses. Please select address of contact address A to use" are displayed.

As an example, in FIG. 12, two types of mail addresses of user A, "a_mail@example.com" as address information 56A and "aaa_mail@example.com" as address information 56B are displayed. Then, in the fourth exemplary embodiment, in a case where the operation of any of the address information 56 by the user is received, the CPU 31 sets the corresponding address indicated by the address information 56 that has received the operation in the executing application.

As described above, the fifth screen shown in FIG. 12 shows all the corresponding addresses corresponding to the executing application. In this way, on the fifth screen, since there are a plurality of corresponding addresses, it is not possible for the image forming apparatus 20 to determine which address should be set, so that all the corresponding addresses are presented and the user is prompted to make a selection.

As described above, in the fourth exemplary embodiment, in a case where the operation of the one-touch key 15 by the user is received and a plurality of corresponding addresses corresponding to the executing application are registered in the contact address, the CPU 31 causes the display unit 37 to display a fifth screen showing all of the plurality of corresponding addresses as a screen showing the address according to the relationship between the registered address and the executing application. Thereby, according to the fourth exemplary embodiment, the user may be made to recognize all the addresses suitable for the executing application.

Further, in the fourth exemplary embodiment, in a case where the operation of any of the address information 56 by the user is received on the fifth screen, the CPU 31 sets the corresponding address indicated by the address information 56 that has received the operation in the executing application. Thereby, according to the fourth exemplary embodiment, in a case where there are a plurality of addresses suitable for the executing application, the address selected by the user may be set in the executing application.

Others

In the above exemplary embodiments, the address table is stored in the storage unit 36 of the image forming apparatus 20, but the present invention is not limited thereto, and the address table may be stored in an external apparatus different from the image forming apparatus 20.

In the above exemplary embodiments, the one-touch key 15 which is an example of the "operation unit" is a hardware one-touch key provided as an operation key of the operation unit 38, but the present invention is not limited thereto and the one-touch key 15 may be a software one-touch key displayed as an operation key on the display unit 37.

In addition, each of the above-mentioned exemplary embodiments can be combined appropriately.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
in a case where a selection function selected by a user does not correspond to an operation address that is an address associated with an operation unit operated by the user, cause a display unit to display a screen showing an address corresponding to a relationship between a registered address, which is an address registered in a contact address associated with the operation address, and the selection function.

2. The information processing apparatus according to claim 1, wherein the processor is configured to:
in a case where the registered address has a corresponding address corresponding to the selection function, cause the display unit to display a first screen indicating whether or not the corresponding address is used in the selection function, as the screen.

3. The information processing apparatus according to claim 2, wherein the processor is configured to:
in a case where a predetermined operation by the user is received on the first screen, set the corresponding address in the selection function.

4. The information processing apparatus according to claim 3, wherein the processor is configured to:
in a case where the registered address does not have the corresponding address corresponding to the selection function, but the operation address corresponds to another function different from the selection function, cause the display unit to display a second screen indicating whether or not to execute the other function, as the screen.

5. The information processing apparatus according to claim 4, wherein the processor is configured to:
in a case where a predetermined operation by the user is received on the second screen, execute the other function.

6. The information processing apparatus according to claim 4, wherein the processor is configured to:
in a case where after the operation address is set in the selection function, another address associated with another operation unit does not correspond to the selection function, but the other address corresponds to another function different from the selection function, cause the display unit to display a third screen showing a procedure for executing the other function, as the screen.

7. The information processing apparatus according to claim 3, wherein the processor is configured to:
in a case where after the operation address is set in the selection function, another address associated with another operation unit does not correspond to the selection function, but the other address corresponds to another function different from the selection function, cause the display unit to display a third screen showing a procedure for executing the other function, as the screen.

8. The information processing apparatus according to claim 2, wherein the processor is configured to:
in a case where the registered address does not have the corresponding address corresponding to the selection function, but the operation address corresponds to another function different from the selection function, cause the display unit to display a second screen indicating whether or not to execute the other function, as the screen.

9. The information processing apparatus according to claim 8, wherein the processor is configured to:
in a case where a predetermined operation by the user is received on the second screen, execute the other function.

10. The information processing apparatus according to claim 8, wherein the processor is configured to:
in a case where after the operation address is set in the selection function, another address associated with another operation unit does not correspond to the selection function, but the other address corresponds to another function different from the selection function, cause the display unit to display a third screen showing a procedure for executing the other function, as the screen.

11. The information processing apparatus according to claim 2, wherein the processor is configured to:
in a case where after the operation address is set in the selection function, another address associated with another operation unit does not correspond to the selection function, but the other address corresponds to another function different from the selection function, cause the display unit to display a third screen showing a procedure for executing the other function, as the screen.

12. The information processing apparatus according to claim 1, wherein the processor is configured to:
in a case where the registered address does not have a corresponding address corresponding to the selection function, but the operation address corresponds to another function different from the selection function, cause the display unit to display a second screen indicating whether or not to execute the other function, as the screen.

13. The information processing apparatus according to claim 12, wherein the processor is configured to:
in a case where a predetermined operation by the user is received on the second screen, execute the other function.

14. The information processing apparatus according to claim 12, wherein the processor is configured to:
in a case where after the operation address is set in the selection function, another address associated with another operation unit does not correspond to the selection function, but the other address corresponds to another function different from the selection function, cause the display unit to display a third screen showing a procedure for executing the other function, as the screen.

15. The information processing apparatus according to claim 1, wherein the processor is configured to:
in a case where after the operation address is set in the selection function, another address associated with another operation unit does not correspond to the selection function, but the other address corresponds to another function different from the selection function, cause the display unit to display a third screen showing a procedure for executing the other function, as the screen.

16. The information processing apparatus according to claim 1, wherein the processor is configured to:
in a case where the operation address does not correspond to the selection function, but the operation address and a corresponding address corresponding to the selection function show common information, set the corresponding address in the selection function, and cause the display unit to display a fourth screen indicating that the corresponding address has been set, as the screen.

17. The information processing apparatus according to claim 1, wherein the processor is configured to:
   in a case where an operation of the operation unit by the user is received and a plurality of corresponding addresses corresponding to the selection function are registered in a contact address, cause the display unit to display a fifth screen showing all of the plurality of corresponding addresses, as the screen.

18. The information processing apparatus according to claim 17, wherein the processor is configured to:
   in a case where a predetermined operation by the user is received on the fifth screen, set the corresponding address that has received the operation in the selection function.

19. A non-transitory computer readable medium storing an information processing program causing a computer to execute a process comprising:
   causing, in a case where a selection function selected by a user does not correspond to an operation address that is an address associated with an operation unit operated by the user, a display unit to display a screen showing an address corresponding to a relationship between a registered address, which is an address registered in a contact address associated with the operation address, and the selection function.

20. An information processing method comprising:
   causing, in a case where a selection function selected by a user does not correspond to an operation address that is an address associated with an operation unit operated by the user, a display unit to display a screen showing an address corresponding to a relationship between a registered address, which is an address registered in a contact address associated with the operation address, and the selection function.

* * * * *